US011891528B2

(12) United States Patent
Gimenez

(10) Patent No.: US 11,891,528 B2
(45) Date of Patent: Feb. 6, 2024

(54) POWDER OF SPHERICAL CROSSLINKABLE POLYAMIDE PARTICLES, PREPARATION PROCESS AND USE WITH THE SELECTIVE LASER SINTERING TECHNIQUE

(71) Applicant: SETUP Performance SAS, Frontonas (FR)

(72) Inventor: Jérome Gimenez, Bron (FR)

(73) Assignee: SETUP Performance SAS, Frontonas (FR)

(*) Notice: Subject to any disclaimer, the term of this patent is extended or adjusted under 35 U.S.C. 154(b) by 12 days.

(21) Appl. No.: 17/555,889

(22) Filed: Dec. 20, 2021

(65) Prior Publication Data

US 2022/0112386 A1 Apr. 14, 2022

Related U.S. Application Data

(63) Continuation of application No. 16/472,318, filed as application No. PCT/FR2017/053776 on Dec. 21, 2017, now Pat. No. 11,236,242.

(30) Foreign Application Priority Data

Dec. 22, 2016 (FR) .................................... 1663160

(51) Int. Cl.
  *C09D 11/101* (2014.01)
  *B29B 9/12* (2006.01)
  (Continued)

(52) U.S. Cl.
  CPC .............. *C09D 11/101* (2013.01); *B29B 9/12* (2013.01); *B33Y 70/10* (2020.01); *C09D 11/102* (2013.01);
  (Continued)

(58) Field of Classification Search
  CPC .. B29K 2077/00; C09D 11/101; C09D 11/102
  See application file for complete search history.

(56) References Cited

U.S. PATENT DOCUMENTS 4,647,630 A 3/1987 Schmid et al.
5,804,681 A 9/1998 Breant
(Continued)

FOREIGN PATENT DOCUMENTS

EP 1686142 A1 8/2006
FR 2535729 A1 5/1984
(Continued)

OTHER PUBLICATIONS

French Search Report for priority application FR1663160 dated Sep. 5, 2017 (in French).
(Continued)

*Primary Examiner* — James Sanders
(74) *Attorney, Agent, or Firm* — Faegre Drinker Biddle & Reath LLP

(57) ABSTRACT

The present invention relates to a powder of spherical crosslinkable polyamide particles, which is suitable for the selective laser sintering (SLS) technique, and also to a process for obtaining such a powder of spherical crosslinkable polyamide particles. The present invention also relates to the production of articles by SLS, followed by a crosslinking step, using said powder of spherical crosslinkable polyamide particles.

10 Claims, 5 Drawing Sheets

(51) Int. Cl.
    *C09D 11/102*    (2014.01)
    *B33Y 70/10*    (2020.01)
    *B33Y 10/00*    (2015.01)
    *B29C 64/153*    (2017.01)
    *B29K 77/00*    (2006.01)
    *B29K 105/24*    (2006.01)

(52) U.S. Cl.
    CPC ........ *B29C 64/153* (2017.08); *B29K 2077/00* (2013.01); *B29K 2105/24* (2013.01); *B33Y 10/00* (2014.12)

(56) References Cited

U.S. PATENT DOCUMENTS

| | | |
|---|---|---|
| 5,932,687 A | 8/1999 | Baumann et al. |
| 6,136,948 A | 10/2000 | Dickens et al. |
| 6,245,281 B1 | 6/2001 | Scholten et al. |
| 8,039,525 B2 | 10/2011 | Loyen et al. |
| 8,287,950 B2 | 10/2012 | Ouvrard et al. |
| 8,444,886 B2 | 5/2013 | Herve |
| 2013/0307196 A1 | 11/2013 | Corriol et al. |
| 2016/0152782 A1 | 6/2016 | Cammage et al. |

FOREIGN PATENT DOCUMENTS

| | | |
|---|---|---|
| GB | 1565674 A | 4/1980 |
| JP | 62-240355 A | 10/1987 |
| JP | 2005-097370 A | 4/2005 |
| JP | 2009-013395 A | 1/2009 |
| JP | 2016-521767 A | 7/2016 |
| WO | 96/06881 A2 | 3/1996 |
| WO | 99/47584 A1 | 9/1999 |
| WO | 2006/051222 A2 | 5/2006 |
| WO | 2007/115977 A1 | 10/2007 |

OTHER PUBLICATIONS

International Search Report for PCT/FR2017/053776 dated Mar. 22, 2018.
Written Opinion of the International Searching Authority for PCT/FR2017/053776 dated Mar. 22, 2018.
International Preliminary Report on Patentability received for PCT Patent Application No. PCT/FR2017/053776, dated Jul. 4, 2019, 17 pages (9 pages of English Translation and 8 pages of Original Document).

| Polymer | Optical microscopy | Polymer | Optical microscopy |
|---|---|---|---|
| Example 1 | | PA 12 (Orgasol Invent Smooth) | |
| Example 2 | | PA 11 (Rilsan Invent Natural) | |
| Example 3 | | Comparative example | |
| Example 4 | | | |

FIG.7

POWDER OF SPHERICAL CROSSLINKABLE POLYAMIDE PARTICLES, PREPARATION PROCESS AND USE WITH THE SELECTIVE LASER SINTERING TECHNIQUE

CROSS-REFERENCE TO RELATED APPLICATIONS

This application is a continuation application of U.S. Ser. No. 16/472,318 filed Jun. 21, 2019. U.S. Ser. No. 16/472,318 is a U.S. national stage application (under 35 U.S.C. § 371) of PCT/FR2017/053776, filed Dec. 21, 2017, which claims benefit of French Application No. 1663160, filed Dec. 22, 2016, all of which are incorporated herein by reference in their entirety.

The present invention relates to a powder of spherical particles of crosslinkable polyamide that are suitable for the technique of selective laser sintering (SLS), as well as to a process for obtaining a powder of spherical particles of crosslinkable polyamide of this type. The present invention also provides the production of articles from said powder of spherical particles of crosslinkable polyamide by SLS followed by a crosslinking step.

Articles can be fabricated by means of an additive technique. The article is produced layer by layer. For this purpose, by means of upstream computer-aided design software (CAD), the three-dimensional (3D) structure of the article to be obtained is divided up into slices. The virtual 3D object to be produced is thus divided up into extremely thin two-dimensional slices. These thin slices are then produced one by one in the form of layers, by carrying out the following binary sequence repeatedly:
  depositing the material necessary for producing the desired article while in the form of a powder to form a continuous bed for each layer, followed by
  agglomerating each layer and bonding the layers together locally in accordance with a predefined pattern by supplying energy or by spraying a liquid in fine droplets.

Thus, the article is constructed by superposing elementary layers that are bonded together by supplying energy or by spraying fine droplets of liquid. The localized energy may be supplied with a directed beam of light (LED or LASER) or with a directed beam of electrons, or in fact with any source of energy that allows the energy to be focused, and enables the bed of powder to be scanned in accordance with the pattern selected by CAD. The energy-material interaction then results either in sintering or in fusion/solidification of the material, or in fact in photo-polymerization or photo-crosslinking of the material, depending on the nature of the material and on the nature of the source of energy employed.

Of the various additive techniques that are known, selective laser sintering, known as SLS, may in particular be mentioned.

The technique of selective laser sintering (rapid prototyping) in order to produce articles from polymer powders is known and is described in U.S. Pat. No. 6,136,948 and Application WO 96/06881.

With the SLS technique, a powder of the material intended to constitute the article is deposited in order to form a continuous bed. A beam from a powerful laser is then applied locally in accordance with the selected pattern and allows the powder to agglomerate in order to form the layer corresponding to the desired article, and also to bond it to the preceding layer by sintering. Under the action of the localized supply of energy, the grains of the powder partially fuse and weld together, providing the layer with cohesion. A fresh bed of powder is then laid down and the procedure recommences.

Many polymers are a priori suitable for the SLS process: polyacetals, polypropylene, polyethylene, ionomers, polyamides, etc. Polyamides (in particular PA 11 and PA 12) are currently the most widely used materials for the production of articles using SLS, in particular for the production of engineering components. The articles fabricated from PA 12 powder satisfy strict requirements as regards mechanical loading (mechanical strength), and have properties that are close to those of parts produced using the transformation techniques habitually employed in plastics processing, such as extrusion or injection molding.

Two important characteristics for a powder formed from plastics material in order to be suitable for the SLS technique are the thermal properties of the plastics material and the grain size of the powder (shape and size of particles). PA 12 has been shown to be the thermoplastic polymer that is the most widely used for the SLS process because it has entirely suitable thermal characteristics. PA 12 is used in the form of a powder of spherical particles in order to provide for a good flow of the powder and a high density by the deposited bed of powder.

The patent U.S. Pat. No. 6,245,281 discloses the optimal physico-chemical properties for PA 12 powders: melting point of 185° C. to 189° C., enthalpy of fusion of 112±17 J/g, crystallization point of 138° C. to 143° C. The PA 12 particles described are 50 micrometers ($\mu$m) to 150 $\mu$m in size.

Powders of spherical particles of PA 12 may be obtained by dissolution/precipitation of PA 12, as described in U.S. Pat. No. 5,932,687, for example They may also be obtained directly during polymer synthesis in suspension or in solution, as described in Patent application WO 2006/051222. A third technique that can be used to obtain spherical particles is the extrusion process, as described in Patent application WO 2007/115977.

The technique that is the most accessible to the person skilled in the art for obtaining polyamide powder is mechanical milling. However, this suffers from the disadvantage of generating non-spherical particles with an uncontrolled shape that could alter the flow and piling properties of the powder and that are thus not very suitable for use with the SLS technique.

Furthermore, grafting alkoxysilane groups onto a polyamide is already known. This type of grafting is carried out in the molten phase (i.e. heating to a temperature above the fusion temperature of the polymer) and results in a grafted polymer that thus is not in the form of a powder and therefore, as a consequence, is not suitable for use with the SLS technique. Thus, patent application WO 1999/047584 describes grafting functionalized trialkoxysilanes onto copolyamides in the molten phase. The resulting polymers are used as a hot-melt adhesive. Patent application FR 2 535 729, which describes the preparation of polyamide crosslinked by functionalized silane grafts, and U.S. Pat. No. 5,804,681, which describes grafting unsaturated alkoxysilanes onto polyamides in order to improve the thermomechanical properties, may also be cited.

However, any chemical modification to a polymer in the molten state, and in particular by "pendant grafting" onto the macromolecular chains, is likely to modify the crystal structure and hence the thermal properties of the polymer, namely its fusion temperature, crystallization temperature, and enthalpies.

Furthermore, examples of chemical modification of powdered polyamide particles at the surface exist which, however, are not at all suitable for the SLS technique.

As an example, Application EP 1 686 142 describes the process for preparing particles of polyamide powder surface-grafted with a functionalized grafting monomer in order to improve the compatibility of the polyamide with the surface coatings. The process comprises a step of mixing polyamide particles with a grafting monomer, followed by a step of irradiation with photons or electrons. The particles obtained are then grafted solely at the surface and have a size that is not suitable for the SLS technique (10 μm±2 μm in the examples).

Furthermore, Patent GB 1 565 674 describes modifying a thermoplastic polymer powder in order to render it crosslinkable, for glass coating applications. The process comprises a first step of impregnating the crosslinking agent onto the polymer, followed by a step for grafting in the molten state.

Thus, there is a need for a powder of polyamide particles having good flow and piling properties, as well as good thermomechanical properties, that can be used to increase the range of use for the SLS technique and avoid creep under load.

The Applicant proposes overcoming the disadvantages mentioned above by providing a powder of polyamide particles that is suitable for the SLS technique, in particular in terms of the size and shape of particles on and in which the crosslinking grafts are grafted. More precisely, the solution proposed by the Applicant provides the use of a powder of spherical particles of polyamide (I) functionalized by crosslinking functions Rt rendering it crosslinkable, said crosslinking functions Rt being present at the surface and in the mass of said particles and said particles of crosslinkable polyamide (I) having a mean diameter d50 in the range 20 μm to 100 μm.

The crosslinking offered by the powder of the invention means that the thermomechanical properties of the polymer can be improved (larger range for the service temperature, mechanical strength, elongation at break, thermal resistance, flexibility, and/or hot yield strength), while the shape and the size of the particles permit good flow and an optimized powder density that are compatible with the SLS technique.

Advantageously, the powder of spherical particles of crosslinkable polyamide (I) displays one or more of the following features, or any combination of at least one of the following features, or even all of the following features when they are not mutually exclusive:

- the mean diameters d10 and d90 of said particles of crosslinkable polyamide (I) are such that (d90-d10) is in the range 10 μm to 80 μm, preferably 20 μm to 60 μm;
- the polyamide is selected from PA 6, PA 6.6, PA 11 and PA 12;
- the crosslinking functions Rt are selected from alkoxysilane, chlorosilane, and acyloxysilane groups, and are preferably alkoxysilane groups;
- the crosslinking functions Rt are introduced onto a polyamide (II) by grafting;
- the crosslinking functions Rt are supplied by grafting, directly onto the amine and/or carboxyl and/or amide functions of a polyamide (II), termed reactive functions Rr, of a crosslinking agent (III) with formula:

$$Rg-R1-Si(R2)_{3-a}(R3)_a.$$ (III)

in which:
- a=0, 1, or 2;
- Rg is a grafting function that is capable of reacting with Rr;
- R1 is a divalent hydrocarbon group or a covalent bond connecting Si directly to Rg;
- R2 is an alkoxy or acyl group or represents a halogen, the groups R2 being identical or different when a=0 or 1;
- R3 is an alkyl group, the groups R3 being identical or different when a=2;
- the grafting function Rg of the crosslinking agent (III) comprises at least one group selected from:
- the amino group —$NH_2$;
- groups having an ethylenic unsaturation, preferably vinyl, allyl, and methacryloyl groups;
- epoxy groups, preferably being selected from glycidyl, glycidoxy, and oxiranyl groups;
- the thiol group —SH;
- halogen atoms, preferably chlorine;
- the isocyanate group —N=C=O; and
- the acylurea group —CO—NH—CO—$NH_2$ or the alkylurea group —R—NH—CO—$NH_2$ in which R is a divalent hydrocarbon group;
- the crosslinking agent (III) is such that a=0, R1 is a divalent hydrocarbon group, preferably a propylene group, R2 is an alkoxy group, preferably methoxy or ethoxy, and Rg is an epoxy group, and preferably a glycidoxy group;
- the crosslinkable polyamide (I) has a proportion of crosslinking functions Rt in the range 0.3% to 9% by weight, preferably 1% to 5% by weight, relative to the total weight of crosslinkable polyamide.

The Applicant also proposes a process for the preparation of a powder of spherical particles of crosslinkable polyamide suitable for the SLS technique, and in particular a powder of spherical particles of crosslinkable polyamide as defined in the context of the invention. The process for the preparation of powder of spherical particles of crosslinkable polyamide (1) comprises the following steps:

a) providing a powder of spherical particles of a polyamide (II), said particles having a mean diameter d50 in the range 20 μm to 100 μm;

b) providing a crosslinking agent (III) comprising both at least one crosslinking function Rt and also at least one grafting function Rg that is capable of reacting with the amine and/or carboxyl and/or amide functions of the polyamide (II), termed reactive functions Rr;

c) mixing the powder of spherical particles of polyamide (II) with the crosslinking agent (III) in order to obtain a mixture (II+III);

d) heating the mixture (II+III) obtained from step c) to a temperature T1 that is in the range from the glass transition temperature of the polyamide (II) $Tg_{(II)}$+5° C. to the glass transition temperature of the polyamide (II) $Tg_{(II)}$+70° C. if $Tg_{(II)}$+70° C.≤$Tcryst_{(II)}$−35° C., or in the range from $Tg_{(II)}$+5° C. to the crystallization temperature of the polyamide (II) $Tcryst_{(II)}$−35° C. if $Tg_{(II)}$+70° C.>$Tcryst_{(II)}$−35° C., in order to obtain a powder of spherical particles of polyamide impregnated with crosslinking agent (IV);

e) heating the polyamide powder impregnated with crosslinking agent (IV) to a temperature T2 that is higher than T1 and lower than the crystallization temperature $Tcryst_{(II)}$ of the polyamide (II), in order to obtain a powder of crosslinkable polyamide (I).

Advantageously, the crosslinking functions are grafted directly onto said powder of polyamide particles. The process for the preparation of the powder of polyamide particles proposed by the Applicant first of all permits the shape and the grain size of the powder of particles to be preserved. The flow properties, those of flowability of the powder of particles and of piling, are thus preserved and controlled. Secondly, because it is carried out in the solid state, and preferably below the crystallization temperature of the polymer, the chemical modification does not modify the crystal structure of the polymer. The powder of polymer particles thus retains the thermal characteristics that are suitable for the SLS process conditioned by the choice of polyamide powder (II). Thus, the thermal profile of the particles of crosslinkable polyamide of the invention is only slightly modified compared with non-crosslinkable particles of that same polyamide: little variation in the enthalpies of fusion and of crystallization (less than 10%), as well as of fusion temperatures (onset and peak), and a slight drop in the crystallization temperatures (offset and peak, maximum 5° C.), thereby contributing to widening the sintering window (i.e. the difference between the offset crystallization temperature and the onset fusion temperature).

In particular, it is possible to carry out the process for the preparation of the powder of spherical particles of crosslinkable polyamide (I) by incorporating one or another of the following features, or any combination of at least two of the following features, or even all of the following features, when they are not mutually exclusive:

the crosslinking agent (III) has the following formula:

$$Rg-R1-Si(R2)_{3-a}(R3)_a \quad \text{(III)}$$

in which:
a=0, 1, or 2;
Rg is a grafting function that is capable of reacting with the reactive functions Rr of the polyamide (II);
R1 is a divalent hydrocarbon group or a covalent bond connecting Si directly to Rg;
R2 is an alkoxy or acyl group or a halogen, the groups R2 being identical or different when a=0 or 1;
R3 is an alkyl group, preferably a C1-C6 alkyl group, the groups R3 being identical or different when a=2;
the mixture in step c) is produced with a proportion of crosslinking agent (III) in the range 1% to 10% by weight, preferably 3% to 8% by weight, and even more preferably 4% to 6% by weight relative to the total weight of crosslinking agent (III) and of polyamide (II);
the heating in step d) is carried out at a temperature T1 in the range from $Tg_{(II)}+10°$ C. to $Tcryst_{(II)}-40°$ C., and even more preferably from $Tg_{(II)}+20°$ C. to $Tcryst_{(II)}-45°$ C., if $Tg_{(II)}+50°$ C.>$Tcryst_{(II)}-35°$ C.;
the heating in step d) is carried out at a temperature T1 in the range from $Tg_{(II)}+10°$ C. to $Tg_{(II)}+70°$ C., preferably from $Tg_{(II)}+20°$ C. to $Tg_{(II)}+70°$ C., if $Tg_{(II)}+70°$ C.<$Tcryst_{(II)}-35°$ C.;
the heating in step e) is carried out at a temperature T2 greater than or equal to T1+10° C. and lower than $Tcryst_{(II)}$, preferably from T1+20° C. to $Tcryst_{(II)}-5°$ C., and even more preferably from T1+30° C. to $Tcryst_{(II)}-10°$ C.

The present invention also provides a powder of spherical particles of crosslinkable polyamide (1) that is capable of being obtained by the preparation process as described in the context of the invention.

The present invention also provides the use of a powder of spherical particles of crosslinkable polyamide (I) of the invention, for the preparation of intermediate articles using the selective laser sintering technique.

The present invention also provides a process for the preparation of an intermediate article starting from a powder of spherical particles of polyamide (I) of the invention using the selective laser sintering technique, in particular by forming superimposed layers of elements that are bonded together in succession.

The present invention also provides a process for the preparation of an article comprising:
i. forming an intermediate article using the selective laser sintering technique, starting from a powder of spherical particles of crosslinkable polyamide (I) as described in the context of the invention; and
ii. crosslinking at least a portion of the crosslinkable functions Rt of said crosslinkable polyamide (I).

The crosslinking in step ii) may be carried out by hydrolysis, and in particular in ambient air.

Finally, the present invention provides an article formed from a powder of spherical particles of crosslinkable polyamide (I) as described in the context of the present invention and obtained after crosslinking at least a portion of the crosslinkable functions Rt of said crosslinkable polyamide (I).

Powder of Spherical Particles of Crosslinkable Polyamide (I)

The present invention provides a polyamide (I) functionalized by crosslinkable functions Rt rendering it crosslinkable.

The crosslinkable polyamide (I) of the present invention is in the form of a powder of spherical particles.

The term "spherical particle" should be understood to mean a particle that has a sphericity index, i.e. a ratio between its largest diameter and its smallest diameter, of less than 1.2.

The particles of crosslinkable polyamide (I) of the present invention have a mean diameter d50 in the range 20 μm to 100 μm, preferably 35 μm to 50 μm.

In an embodiment, the particles of crosslinkable polyamide (I) of the present invention have a mean diameter d90 in the range 45 μm to 80 μm, preferably 50 μm to 75 μm.

In an embodiment, the particles of crosslinkable polyamide (I) have a mean diameter d10 in the range 10 μm to 35 μm, preferably 15 μm to 30 μm.

The term "particles having a mean diameter d10/d50/d90" as used in the context of the present invention should be understood to mean the diameter (of particles) for which 10%/50%/90% by volume of said particles has a lower diameter, as measured with the dry laser granulometry technique, also known as laser diffraction granulometry.

Advantageously, the spherical particles of crosslinkable polyamide (I) are homogeneous in size.

The term "homogeneous in size" as used in the context of the present invention should be understood to mean that the size distribution of the particles is narrow, and in particular that the mean diameters of the particles are such that (d90-d10) is in the range 10 μm to 80 μm, preferably 20 μm to 60 μm.

In an embodiment, the crosslinkable polyamide (I) has a glass transition temperature $Tg_{(I)}$ in the range 30° C. to 90° C., and preferably 40° C. to 60° C.

The glass transition temperature of a material corresponds to a temperature at which the mechanical properties change, wherein the material changes from a glassy state (rigid solid) to a rubbery state with a greater capacity for deformation. It characterizes the amorphous phase of a polymer. With a polymer such as a polyamide, this phenomenon is linked to the movements of segments of macromolecular chains located in the amorphous domains.

In the context of the present invention, the glass transition temperatures are measured by differential scanning calorimetry, DSC.

In an embodiment, the crosslinkable polyamide (I) has a fusion temperature $Tfus_{(I)}$ in the range 170° C. to 220° C., preferably 175° C. to 205° C.

The fusion temperature corresponds to the temperature measured at the maximum of the peak of the thermal phenomenon corresponding to fusion (termed the Tfus peak). In the context of the present invention, the fusion temperatures are measured by differential scanning calorimetry, DSC. The "onset" value that is frequently measured corresponds to the start of the phenomenon of fusion of the crystallites and is an extrapolated temperature corresponding to the intersection of the base line of the peak and of the tangent to the point with the largest slope of the first portion of the fusion peak for temperatures below the maximum temperature for the peak.

In an embodiment, the crosslinkable polyamide (I) has a crystallization temperature $Tcryst_{(I)}$ in the range 110° C. to 170° C., preferably 145° C. to 165° C.

The crystallization temperature corresponds to the temperature measured at the maximum of the peak of the thermal phenomenon corresponding to crystallization (termed Tcryst peak). The crystallization temperature may be measured by differential scanning calorimetry, DSC. The "offset" value that is frequently measured corresponds to the end of the phenomenon of crystallization of the crystallites and is an extrapolated temperature corresponding to the intersection of the base line of the peak and of the tangent to the point with the largest slope of the second portion of the crystallization peak for temperatures above the maximum temperature of the peak.

In an embodiment, the enthalpy of fusion of the polyamide (I) is in the range from −120 J/g to −80 J/g.

The enthalpy of fusion (ΔHfus) corresponds to the energy absorbed by the polyamide in the form of heat when it passes from the solid state to the liquid state.

In the context of the present invention, the enthalpies of fusion are measured by differential scanning calorimetry, DSC, in particular during the first scan when the temperature is increased, as is described in the examples below.

The polyamide may be an aliphatic or semi-aromatic, semi-crystalline polyamide.

In an embodiment, the polyamide is an aliphatic polyamide. In this embodiment, the polyamide is selected from PA 6 (polycaprolactam: $[NH—(CH_2)_5—CO]_n$), PA 6.6 (polyhexamethylene adipamide: $[NH—(CH_2)_6—NH—CO—(CH_2)_4—CO]_n$), PA 6.9 (polyhexamethylene nonanediamide: $[NH—(CH_2)_6—NH—CO—(CH_2)_7—CO]_n$), PA 6.10 (polyhexamethylene sebacamide: $[NH—(CH_2)_6—NH—CO—(CH_2)_8—CO]_n$), PA 6.12 (polyhexamethylene dodecanediamide: $[NH—(CH_2)_6—NH—CO—(CH_2)_{10}—CO]_n$), PA 10.10 (polydecamethylene sebacamide: $[NH—(CH_2)10-NH—CO—(CH_2)_{10}—CO]_n$), PA 10.12 (polydecamethylene dodecanediamide $[NH—(CH_2)10-NH—CO—(CH_2)_{10}—CO]_n$), PA 11 (polyundecanamide: $[NH—(CH_2)_{10}—CO]_n$), PA 12 (polylauryl lactam: $[NH—(CH_2)_{11}—CO]_n$).

In an embodiment, the polyamide is a semi-aromatic, semi-crystalline polyamide. Examples of semi-aromatic, semi-crystalline polyamides that are suitable in the context of the present invention that may be cited are PA mXD.6 (polymetaxylylene adipamide) and PA mXD.10 (polymetaxylylene sebacamide). In a particular embodiment, the polyamide (I) is PA mXD.10.

In a preferred embodiment of the invention, the polyamide is an aliphatic polyamide, preferably selected from PA 6, PA 6.6, PA 6.10, PA10.10, PA10.12, PA 11 and PA 12, and preferably PA 11 and PA 12.

The crosslinkable polyamide (I) of the present invention comprises crosslinking functions Rt present at the surface and in the mass of said polyamide particles.

The term "groups present at the surface and in the mass of the particles" should be understood to mean that the groups are present not only at the surface of the particles, but also within these particles, and in particular at the core.

In an embodiment, the percentage of crosslinking functions Rt of the crosslinkable polyamide (I) are advantageously in the range 0.3% to 9% by weight, preferably 1% to 5% by weight, relative to the total weight of crosslinkable polyamide (I).

In an embodiment, the crosslinkable polyamide (I) is crosslinkable in the presence of water, in particular in the presence of water present in ambient air, via the crosslinking functions Rt that it comprises.

In an embodiment, the crosslinking functions Rt are crosslinkable at a temperature in a range 20° C. to 100° C., preferably 50° C. to 95° C. This applies particularly with crosslinkable functions Rt selected from alkoxysilane and chlorosilane groups.

In an embodiment, the crosslinking functions Rt are supplied by grafting, preferably by direct grafting onto the amine and/or acid and/or amide functions of a polyamide (II), termed reactive functions Rr, of a crosslinking agent (III) with formula:

$$Rg\text{-}R1\text{-}Si(R2)_{3-a}(R3)_a \tag{III}$$

in which:
  a=0, 1, or 2;
  Rg is a grafting function that is capable of reacting with the reactive functions Rr;
  R1 is a divalent hydrocarbon group or a covalent bond connecting Si directly to Rg;
  R2 is an alkoxy or acyl group or a halogen atom, the groups R2 being identical or different when a=0 or 1;
  R3 is an alkyl group, preferably a C1-C6 alkyl group, the groups R3 being identical or different when a=2.

The term "amine function of a polyamide" should be understood to mean a primary amine, i.e. a $—NH_2$ group. In an embodiment, the polyamide comprises a primary amine function at the end of the polyamide chain.

The term "carboxyl function of a polyamide" or "acid function of a polyamide" as used in the context of the present invention should be understood to mean a carboxylic acid group, i.e. a —COOH group. In an embodiment, the polyamide comprises an acid function at the end of the polyamide chain.

The term "amide function of a polyamide" as used in the context of the present invention should be understood to mean secondary amide functions of the polyamide chains.

The term "divalent hydrocarbon group" as used in the context of the present invention should be understood to mean a divalent alkyl group, preferably a divalent (C1-C20) alkyl group, preferably divalent (C1-C10) alkyl, and more preferably a (C2-C5) alkyl group.

The term "alkoxy" as used in the context of the present invention should be understood to mean a —O(C1-C10) alkyl group, preferably —O(C1-C6) alkyl, and more preferably —O(C1-C3) alkyl. Examples of suitable alkoxy groups in the context of the present invention that may be cited are the methoxy, ethoxy, propyloxy, iso-propyloxy, butyloxy, iso-butyloxy, sec-butyloxy, tert-butyloxy, pentyloxy, and hexyloxy groups. Preferably, an alkoxy group of the present invention is a methoxy group or an ethoxy group.

The term "alkyl" means a linear or branched, acyclic alkyl group. Examples of suitable alkyl groups in the context of the present invention that may be cited are the methyl, ethyl, propyl, iso-propyl, butyl, iso-butyl, sec-butyl, tert-butyl, pentyl, iso-pentyl, sec-pentyl, neo-pentyl, hexyl, heptyl, octyl, nonyl, and decyl groups.

The term "acyl" as used in the context of the present invention should be understood to mean a —C(=O)(C1-C10)alkyl group, preferably —C(=O)(C1-C6)alkyl. Examples of suitable acyl groups in the context of the present invention that may be cited in particular are the formyl, acetyl and propionyl groups.

The term "halogen atom" should be understood to mean an atom of fluorine, chlorine, bromine, or iodine, preferably an atom of chlorine.

The crosslinking functions Rt are advantageously selected from alkoxysilane, chlorosilane and acyloxysilane groups, preferably alkoxysilane.

In an embodiment, the grafting function Rg of the crosslinking agent (III) comprises at least one group selected from:
- the amino group —NH$_2$;
- groups comprising an ethylenic unsaturation, preferably the vinyl, allyl and methacryloyl groups;
- epoxy groups, preferably being selected from the glycidyl, glycidoxy, oxiranyl groups;
- the thiol group —SH;
- halogen atoms, preferably chlorine;
- the isocyanate group —N=C=O; and
- the acylurea group —CO—NH—CO—NH$_2$ or alkylurea group —R—NH—CO—NH$_2$, in which R is a divalent hydrocarbon group.

The term "ethylenic unsaturation" should be understood to mean a carbon-carbon double bond. Examples of groups comprising one or more ethylenic unsaturations that are suitable in the context of the present invention that may be cited are the vinyl, allyl and methacryloyl groups.

The term "epoxy group" should be understood to mean a group comprising a cyclic ether with 3 members, also known as oxacyclopropane. Examples of epoxy groups that may in particular be cited are the glycidyl, glycidoxy and oxiranyl groups.

In an embodiment, the grafting function Rg of the crosslinking agent (III) comprises at least one group selected from epoxy groups and halogen atoms. In one particular embodiment of the invention, Rg is an epoxy group, preferably glycidoxy. In another particular embodiment, Rg represents a halogen atom, preferably chlorine.

In an embodiment, the crosslinking agent (III) is such that a=0.

In an embodiment, the crosslinking agent (III) is such that a=0 or 1, and the groups R2 are all identical.

In an embodiment, the crosslinking agent (III) is such that a=2, and the groups R3 are all identical.

Preferably, R1 is a divalent hydrocarbon group, preferably selected from ethylene, propylene and butylene groups, preferably propylene.

In an embodiment, Rg represents an epoxy group, preferably glycidoxy, and R1 represents a divalent hydrocarbon group, preferably propylene.

Preferably, all of the groups R2, preferably identical, are alkoxy groups, preferably —OMe or —OEt groups. In a particular embodiment of the invention, all of the groups R2 are identical and represent —OMe or —OEt.

Preferably, R3 is a methyl group.

In a particular embodiment, a=0, R1 is a divalent hydrocarbon group, preferably a propylene group, R2 is an alkoxy group, preferably methoxy or ethoxy, and Rg is an epoxy group, preferably a glycidoxy group.

In another particular embodiment of the invention, a=0, R1 is a covalent bond, R2 is an alkoxy group, preferably methoxy or ethoxy, and Rg is a halogen atom, and preferably chlorine.

In another particular embodiment of the invention, a=1, R1 is a covalent bond, R2 is an alkoxy group, preferably methoxy or ethoxy, R3 is an alkyl group, preferably methyl, and Rg is a halogen atom, and preferably chlorine.

Examples of crosslinking agents that may be suitable in the present invention that may be cited are glycidoxypropyl trimethoxysilane, glycidoxypropyl triethoxysilane, aminopropyl trimethoxysilane, aminopropyl triethoxysilane γ-isocyanatopropyl trimethoxysilane, vinyl trimethoxysilane, vinyl triethoxysilane, allyl trimethoxysilane, vinyl triacetoxysilane, vinyl tris-(2-methoxyethoxy)silane, chlorotrimethoxysilane, chlorotriethoxysilane, chloromethyl(methyl)diethoxysilane and chloromethyl(methyl) dimethoxysilane.

Process for Preparing a Powder of Spherical Particles of Crosslinkable Polyamide (I)

The present invention also provides a process for the preparation of a powder of spherical particles of crosslinkable polyamide (I) as defined in the context of the invention.

This preparation process comprises the following steps:

a) providing a powder of spherical particles of polyamide (II), said particles having a mean diameter d50 in the range 20 μm to 100 μm;

b) providing a crosslinking agent (III) comprising both at least one crosslinking function Rt and also at least one grafting function Rg that is capable of reacting with the amine and/or carboxyl and/or amide functions of the polyamide (II), termed reactive functions Rr;

c) mixing the powder of spherical particles of polyamide (II) with the crosslinking agent (III) in order to obtain a mixture (II+III);

d) heating the mixture (II+III) obtained from step c) to a temperature T1 that is in the range from the glass transition temperature of the polyamide (II) Tg$_{(II)}$+5° C. to the glass transition temperature of the polyamide (II) Tg$_{(II)}$+70° C. or to the crystallization temperature of the polyamide (II) Tcryst$_{(II)}$−35° C. if Tg$_{(II)}$+70° C.>Tcryst$_{(II)}$−35° C., in order to obtain a powder of spherical particles of polyamide impregnated with crosslinking agent (IV);

e) heating the polyamide powder impregnated with crosslinking agent (IV) to a temperature T2 that is higher than T1 and lower than the crystallization temperature Tcryst$_{(II)}$ of the polyamide (II), in order to obtain a powder of crosslinkable polyamide (I).

Advantageously, the preparation process may be used to obtain a powder of spherical particles of crosslinkable polyamide (I) with crosslinkable functions present at the surface and in the mass of the particles.

Advantageously, the powder of particles of crosslinkable polyamide (I) obtained is dry.

In an embodiment, the starting polyamide (II) has a glass transition temperature Tg$_{(II)}$ in the range 30° C. to 90° C., preferably 40° C. to 60° C.

In an embodiment, the starting polyamide (II) has a fusion temperature Tfus$_{(II)}$ in the range 170° C. to 220° C., preferably 175° C. to 205° C.

In an embodiment, the starting polyamide (II) has a crystallization temperature Tcryst$_{(II)}$ in the range 110° C. to 170° C., preferably 145° C. to 165° C.

In an embodiment, the enthalpy of fusion of the polyamide (I) is in the range from −120 J/g to −80 J/g.

In an embodiment, the polyamide (II) is in the form of spherical particles with a mean diameter d50 in the range 20 µm to 100 µm, preferably 35 µm to 50 µm.

The polyamide (II) is aliphatic or semi-aromatic, semi-crystalline.

In an embodiment, the polyamide (II) is an aliphatic polyamide. In this embodiment, the polyamide (II) is selected from PA 6 (polycaprolactam: $[NH-(CH_2)_5-CO]_n$), PA 6.6 (polyhexamethylene adipamide: $[NH-(CH_2)_6-NH-CO-(CH_2)_4-CO]_n$), PA 6.9 (polyhexamethylene nonanediamide: $[NH-(CH_2)_6-NH-CO-(CH_2)_7-CO]_n$), PA 6.10 (polyhexamethylene sebacamide: $[NH-(CH_2)_6-NH-CO-(CH_2)_8-CO]_n$), PA6.12 (polyhexamethylene dodecanediamide: $[NH-(CH_2)_6-NH-CO-(CH_2)_{10}-CO]_n$), PA 10.10 (polydecamethylene sebacamide: $[NH-(CH_2)_{10}-NH-CO-(CH_2)_{10}CO]_n$), PA 10.12 (polydecamethylene dodecanediamide: $[NH-(CH_2)_{10}-NH-CO-(CH_2)_{10}-CO]_n$), PA 11 (polyundecanamide: $[NH-(CH_2)_{10}-CO]_n$), and PA 12 (polylauryl lactam: $[NH-(CH_2)_{11}-CO]_n$).

A BRIEF DESCRIPTION OF THE FIGURES

FIG. 1 represents the IR spectra for Example 1.
FIG. 2 represents the IR spectra for Example 2.
FIG. 3 represents the IR spectra for Example 3.
FIG. 4 represents the IR spectra for Example 4.
FIG. 5 represents graphs of the variation of the elastic modulus and the loss factor or damping factor corresponding to the tangent of the loss angle delta (Tan Delta) for Examples 5 and 6 compared with that for the reference PA 12 and for the comparative example.
FIG. 6 represents graphs of the variation of the elastic modulus and the loss factor or damping factor corresponding to the tangent of the loss angle delta (Tan Delta), for Example 7 compared with that for the reference PA 11
FIG. 7 represents optical microscope images for PA12, PA11, the polymers of Examples 1 to 4 and that for the comparative example.

In an embodiment, the polyamide (II) is a semi-aromatic, semi-crystalline polyamide. Examples of suitable semi-aromatic, semi-crystalline polyamides in the context of the present invention that may be cited are PA mXD.6 (polymetaxylylene adipamide) and PA mXD.10 (polymetaxylylene sebacamide). In one particular embodiment, the polyamide (II) is PA mXD.10.

In a preferred embodiment of the invention, the polyamide (II) is an aliphatic polyamide, preferably selected from PA 6, PA 6.6, PA 6.10, PA10.10, PA10.12, PA 11 and PA 12, and preferably PA 11 and PA 12.

In a first embodiment, the crosslinking functions Rt are introduced during the synthesis of the polyamide (II).

In another embodiment, the crosslinking functions Rt are provided by direct grafting onto the polyamide (II). In this regard, the polyamide (II) carries reactive functions on which a crosslinking agent reacts. In this embodiment, the crosslinking functions Rt are supplied by grafting, directly onto the amine and/or carboxyl and/or amide functions of the polyamide (II), termed reactive functions Rr, of a crosslinking agent (III). In other words, the crosslinkable polyamide (I) is characterized in that, when it is being produced, the functions Rg of the crosslinking agents (III) react with the reactive functions Rr of the polyamide (II) to result in grafting of the crosslinkable functions Rt.

Advantageously, the crosslinking agent (III) is as defined above.

The starting polyamides (II) and the crosslinking agents (III) are commercially available, in particular from Arkema and Momentive Performance Materials Inc respectively.

Advantageously, in accordance with the invention, the crosslinkable polyamide (I) differs from the starting polyamide (II) only in the presence of crosslinkable functions.

In an embodiment, the mixture in step c) is produced with a proportion of crosslinking agent (III) in the range 1% to 10% by weight, preferably 3% to 8% by weight, and even more preferably 4% to 6% by weight, relative to the total weight of crosslinking agent (III) and of polyamide (II).

Advantageously, the percentage of the crosslinking functions present in the crosslinking agent (III) represents 30% to 90% by weight of the crosslinking agent (III). Thus, when 1% to 10% by weight of crosslinking agent (III) is used to prepare the crosslinkable polyamide (I), this advantageously has a percentage of crosslinking functions Rt in the range 0.3% to 9% by weight, and preferably 1% to 5% by weight, relative to the total weight of crosslinkable polyamide (I).

Advantageously, the amount of grafting is in the range 50% to 100%, preferably 60% to 100% and even more preferably 70% to 100%. The amount of grafting here is the yield from the grafting step.

In an embodiment, the mixture in step c) is produced at a temperature in the range 20° C. to 30° C.

In an embodiment, the mixing in step c) is carried out dry, without a solvent, in particular in a container or a sealed mixer, in an inert atmosphere or otherwise.

In an embodiment, if $Tg_{(II)}+70°$ C.$>Tcryst_{(II)}-35°$ C., the heating in step d) is carried out at a temperature T1 in the range from $Tg_{(II)}+5°$ C. to $Tcryst_{(II)}-35°$ C., preferably from $Tg_{(II)}+10°$ C. to $Tcryst_{(II)}-40°$ C., and even more preferably from $Tg_{(II)}+20°$ C. to $Tcryst_{(II)}-45°$ C.

In an embodiment, if $Tg_{(II)}+70°$ C.$<Tcryst_{(II)}-35°$ C., the heating in step d) is carried out at a temperature T1 in the range from $Tg_{(II)}+5°$ C. to $Tg_{(II)}+70°$ C., preferably $Tg_{(II)}+10°$ C. to $Tg_{(II)}+70°$ C., preferably from $Tg_{(II)}+20°$ C. to $Tg_{(II)}+70°$ C.

In an embodiment, the heating step d) is carried out in a sealed container, which may or may not be stirred, preferably in an inert atmosphere, in particular nitrogen or argon.

In an embodiment, the heating in step e) is carried out at a temperature T2 greater than or equal to T1+10° C. and lower than $Tcryst_{(II)}$, preferably from T1+20° C. to $Tcryst_{(II)}-5°$ C., and even more preferably from T1+30° C. to $Tcryst_{(II)}-10°$ C.

In general, the heating of step d) to the temperature T1 is maintained for a period of 1 hour (h) to 4 h and the heating of step e) to the temperature T2 is maintained for a period of 3 h to 12 h.

In a particular embodiment of the invention, the preparation process comprises a step f), which is subsequent to step e), for adding a flow agent, preferably selected from silicas or fumed silicas, a reinforcing filler, preferably selected from solid or hollow glass beads, carbon fibers, wollastonite fibers or aluminas, a flame retardant, a thermal stabilizer, an antistatic agent or conductive agent, or a colorant.

Use of a Powder of Spherical Particles of Crosslinkable Polyamide (I)

Formation of an Intermediate Article with the SLS Technique

The present invention also provides the use of a powder of spherical particles of crosslinkable polyamide (I) as defined in the context of the invention for the preparation of articles, termed intermediate articles, using the selective laser sintering technique (SLS). The present invention also provides a process for the preparation of articles, known as intermediate articles, using the selective laser sintering technique (SLS), from a powder of spherical particles of crosslinkable polymer (I) of the present invention.

The three-dimensional shape of the article, termed the intermediate article, is then produced by the SLS technique, i.e. by forming superimposed layers of elements that are bonded together in succession by repeating the following steps:

a) depositing a continuous bed of powder comprising or exclusively constituted by a powder of spherical particles of crosslinkable polyamide (I) as defined in the context of the invention;

b) carrying out localized consolidation of a portion of the deposited powder of the spherical particles of crosslinkable polyamide (I) by applying a laser beam in accordance with a predetermined pattern for each layer, in order to generate the layer element, and simultaneously bonding the layer element that has been formed thereby to the preceding layer, in a manner such as to cause the desired three-dimensional shape of the intermediate article to grow progressively.

Advantageously, the continuous bed of powder of step a) has a constant thickness and extends as a surface above the section of the desired intermediate article taken at the level of the layer, in order to guarantee precision at the ends of the article. The thickness of the bed of powder is advantageously in the range 40 µm to 120 µm.

The consolidation of step b) is carried out by laser treatment.

To this end, it is in particular possible to use any SLS printing machine that is known to the person skilled in the art such as, for example a 3D printer of the SnowWhite type from Sharebot, of the Vanguard HS type 3D Systems or of the P396 type from EOS.

When a SnowWhite type printer is used, the power of the laser is advantageously in the range 4 watts (W) to 8 W.

The movement rate of the laser is advantageously in the range 0.2 meters per second (m/s) to 2.5 m/s, preferably 0.8 m/s to 2 m/s.

The parameters of the SLS printing machine are selected in a manner such that the surface temperature of the bed of powder is in the sintering range, i.e. comprised between the offset crystallization temperature and the onset fusion temperature, and preferably is in the range from $Tcryst_{(f)}offset+10°$ C. to $Tfus_{(f)}onset-5°$ C.

Advantageously, the powder of particles of crosslinkable polyamide (I) does not crosslink during the passage of the laser and the parts obtained are still thermoplastic.

Once the three-dimensional structure of the intermediate article has been formed, the non-consolidated material is then eliminated.

Advantageously, the powder of particles of crosslinkable polyamide (I) employed but that has not been subjected to laser impact is not agglomerated under the action of the heat and does not undergo any modification at all, and particularly advantageously can be used again for the preparation of articles by SLS, and in particular at least 5 times.

Formation of an Article by Crosslinking an Intermediate Article

The present invention also provides an article formed by a first step for selective laser sintering (SLS) of a powder of spherical particles of crosslinkable polyamide (I) such as that defined in the context of the invention, followed by a step for crosslinking the crosslinking functions of said crosslinkable polyamide (I).

The present invention provides the preparation of a polyamide article, comprising:

i. forming an intermediate article using the selective laser sintering technique, starting from a powder of spherical particles of crosslinkable polyamide (I) such as that defined in the context of the invention, and in particular in accordance with the process described in the context of the invention;

ii. crosslinking at least a portion of the crosslinkable functions Rt of said crosslinkable polyamide of the intermediate article.

In an embodiment, the crosslinking of step ii) is carried out in the presence of water, preferably by take-up of moisture from the open air or in a controlled atmosphere, for example at 40° C. with a relative humidity of 80%, or by immersion in water.

In a particular embodiment, the crosslinking of step ii) is carried out by immersing the intermediate article in water, preferably at a temperature in the range 20° C. to 100° C., preferably 50° C. to 95° C., for 1 h to 24 h, preferably 6 h to 18 h and more preferably 9 h to 15 h.

In an embodiment, the amount of crosslinking is in the range 70% to 100%, preferably 100%.

The "amount of crosslinking" of the present invention should be understood to mean the proportion of crosslinkable functions in the crosslinkable polyamide that has been crosslinked. This proportion is expressed as the percentage by weight relative to the initial weight of the crosslinking functions.

In an embodiment, the process for the preparation of a polyamide article as mentioned above furthermore comprises a step iii), which is subsequent to step ii), for drying the article that has been formed. Preferably, this drying step is carried out at a temperature in the range 20° C. to 100° C., preferably 50° C. to 95° C., in particular for 1 h to 12 h, preferably 3 h to 6 h.

The present invention is illustrated in the examples below, which are given purely by way of illustration without in any way limiting the scope. The examples make reference to the accompanying figures.

FIG. 1 represents the IR spectra for Example 1, with:
1: glycidoxypropyl trimethoxysilane (Silquest A 187 marketed by Momentive Performance Materials Inc);
2: PA 12 (Orgasol invent smooth marketed by Arkema);
3: mixture of 95% of PA 12 (Orgasol invent smooth marketed by Arkema)+5% of glycidoxypropyl trimethoxysilane (Silquest A 187 marketed by Momentive Performance Materials Inc);
4: PA 12 (Orgasol invent smooth marketed by Arkema) impregnated with glycidoxypropyl trimethoxysilane (Silquest A 187 marketed by Momentive Performance Materials Inc) after the impregnation phase at 80° C.; and
5: PA 12 grafted with 5% of glycidoxypropyl trimethoxysilane.

FIG. 2 represents the IR spectra for Example 2, with:
1: glycidoxypropyl triethoxysilane (Silquest A1871 marketed by Momentive Performance Materials Inc);
2: PA 12 (Orgasol invent smooth marketed by Arkema);
3: mixture of 95% PA 12 (Orgasol invent smooth marketed by Arkema)+5% of glycidoxypropyl triethoxysilane (Silquest A1871 marketed by Momentive Performance Materials Inc); and
4: PA 12 grafted with 5% of glycidoxypropyl triethoxysilane.

FIG. 3 represents the IR spectra for Example 3, with:
1: glycidoxypropyl triethoxysilane (Silquest A1871 marketed by Momentive Performance Materials Inc);
2: PA 12 (Orgasol invent smooth marketed by Arkema);
3: mixture of 92% PA 12 (Orgasol invent smooth marketed by Arkema)+8% of glycidoxypropyl triethoxysilane (Silquest A1871 marketed by Momentive Performance Materials Inc); and
4: PA 12 grafted with 8% of glycidoxypropyl triethoxysilane.

FIG. 4 represents the IR spectra for Example 4, with:
1: glycidoxypropyl triethoxysilane (Silquest A1871 marketed by Momentive Performance Materials Inc);
2: PA 11 (Rilsan Invent Natural marketed by Arkema);
3: mixture of 94% PA 11 (Rilsan Invent Natural marketed by Arkema)+6% of glycidoxypropyl triethoxysilane (Silquest A1871 marketed by Momentive Performance Materials Inc); and
4: PA 11 grafted with 6% of glycidoxypropyl triethoxysilane.

FIG. 5 represents graphs of the variation of the elastic modulus and the loss factor or damping factor corresponding to the tangent of the loss angle delta (Tan Delta) for Examples 5 and 6 compared with that for the reference PA 12 and for the comparative example, with:
graph 1: Example 5;
graph 2: Example 6;
graph 3: PA 12 (Orgasol invent smooth marketed by Arkema); and
graph 4: comparative example.

FIG. 7 represents optical microscope images for PA12, PA11, the polymers of Examples 1 to 4 and that for the comparative example.

EXAMPLES

Materials and Methods

Figure 1:
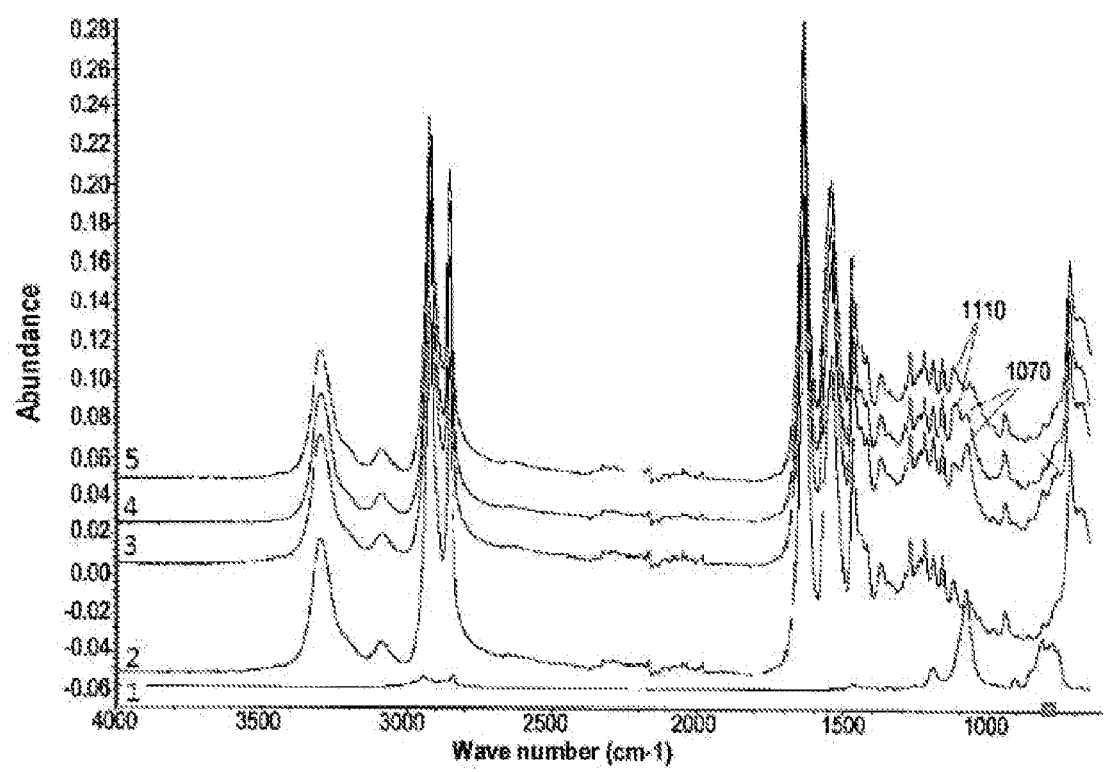

DSC analysis: The differential scanning analyses (DSC) were carried out with a DSC Q20 instrument from TA instruments. The thermal cycle applied was as follows: $1^{st}$ ramp-up from ambient temperature to 240° C. at 10° C./min, temperature ramp-down 240° C. to −20° C. at 10° C./min, $2^{nd}$ ramp-up from a temperature of −20° C. to 240° C. at 10° C./min.

Grain size and shape of particles: The grain size for powders of polymer particles was measured by dry laser granulometry with the aid of a Malvern Instruments Mastersizer 2000 granulometer. The shape of the particles was observed by optical microscopy with the aid of a USB microscope from Andonstar.

Thermoplasticity: The thermoplasticity of the polymers was validated by producing a thin film by thermocompression with a thermoregulated hydraulic press (40 grams (g) of powder deposited between the press plates heated to 220° C., pressed at 10 bar with a holding period of 2 minutes).

Preparation of a powder of spherical particles of crosslinkable polyamide of the invention: 1 kilogram (k) of powder of polyamide (II) was dry mixed with the crosslinking agent (III) until a sticky paste was obtained which did not flow. The mixture (II+III) was then introduced into a sealed stainless steel container that was then placed in a programmable oven. The following thermal cycle was applied: isothermal at 80° C. for 3 h in order to carry out impregnation of the powder, followed by isothermal at 130° C. for 8 h in order to carry out grafting.

Infrared analysis: Infrared spectroscopy was carried out in reflection with a Nicolet IS10 spectrometer equipped with a Smart ITR cell.

Thermogravimetric analysis (TGA): the TGA analysis was carried out under an inert atmosphere (nitrogen) by applying a temperature ramp-up of 10° C./min up to 650° C. with a TGA Q500 instrument from TA instruments.

Example 1: Preparation of a Powder of Spherical Particles of Crosslinkable Polyamide of Type PA 12 Grafted with 5% w/w of Glycidoxypropyl Trimethoxysilane A PA 12 powder suitable for laser sintering (Orgasol invent smooth marketed by Arkema) (d50=38 μm, spherical grain, fusion temperature equal to 182° C., glass transition temperature equal to 40° C.) was modified according to the invention. The grafting agent was glycidoxypropyl trimethoxysilane (Silquest A 187 marketed by Momentive Performance Materials Inc) in a proportion of 5% w/w. A container of crosslinkable polyamide of the invention was prepared in accordance with the process described in the "Materials and method" section.

Another container of powder of particles de PA 12 (Orgasol smooth invent marketed by Arkema), impregnated with 5% w/w of glycidoxypropyl trimethoxysilane (Silquest A 187 marketed by Momentive Performance Materials Inc) was also prepared in the same manner, but removed from the oven after the impregnation phase at 80° C. before the grafting phase.

After cooling, the powder of particles of crosslinkable polyamide obtained was dried and regained flow properties that were close to that of the unmodified PA 12 (Orgasol invent smooth marketed by Arkema).

In order to verify grafting of the glycidoxypropyl trimethoxysilane, an analysis by infrared spectroscopy and thermogravimetric analysis (TGA) was carried out (i) on the powder of particles of crosslinkable polyamide and (ii) on the powder of particles of non-grafted PA 12 impregnated with glycidoxypropyl trimethoxysilane.

The infrared analysis showed that the absorbance peak at 760 $cm^{-1}$, which is characteristic of the epoxy function of silane, present in the initial mixture and in the sample removed at the end of the impregnation phase (see FIG. 1, graphs 3 and 4), had disappeared after the grafting phase (see FIG. 1, graph 5). These epoxy functions were consumed by the grafting reaction.

The absorbance peak at 1072 $cm^{-1}$, which is characteristic of —O—CH— bonds, was shifted to 1110 $cm^{-1}$ (see FIG. 1).

Regarding the powder removed at the end of the impregnation phase, the two peaks coincided: grafting had already commenced during the impregnation phase. The TGA analysis provided a proportion of volatiles of 4% to 4.5%.

Regarding the powder of particles of polyamide removed at the end of the grafting phase, the peak at 1070 $cm^{-1}$ had disappeared. The proportion of volatiles measured by TGA was less than 0.2%, which indicated that grafting was almost complete.

The thermal profile of the powder of particles of crosslinkable polyamide was determined by DSC analysis. The results prove that the thermal profile of the PA 12 powder was not modified by the grafting (see Table 1).

The grain size of the powder obtained was almost unmodified (see Table 2 and FIG. 7). The spherical shape of the particles was retained. The particle size remained homogeneous: the (d90-d10) value was 26 µm, and was comparable to that of PA 12 (23 µm).

The thermoplasticity of the grafted PA powder was validated by producing a thin film by thermocompression with a thermoregulated hydraulic press. The film obtained was perfectly homogeneous, thereby indicating that the PA 12 powder grafted with 5% w/w of glycidoxypropyl trimethoxysilane was still thermoplastic.

Thus, the PA 12 particles grafted with 5% w/w of glycidoxypropyl trimethoxysilane of the invention were spherical and homogeneous in size and suitable for the SLS technique. The powder obtained thereby was dry and had good flow properties. In addition, the thermal profile of the powder of spherical particles of PA 12 grafted with 5% w/w of glycidoxypropyl trimethoxysilane of the invention had not been modified by the grafting and thus retained thermal properties that are suitable for the SLS technique.

ethoxysilane (Silquest A1871 marketed by Momentive Performance Materials Inc) was also prepared, as described in Example 1.

Figure 2:
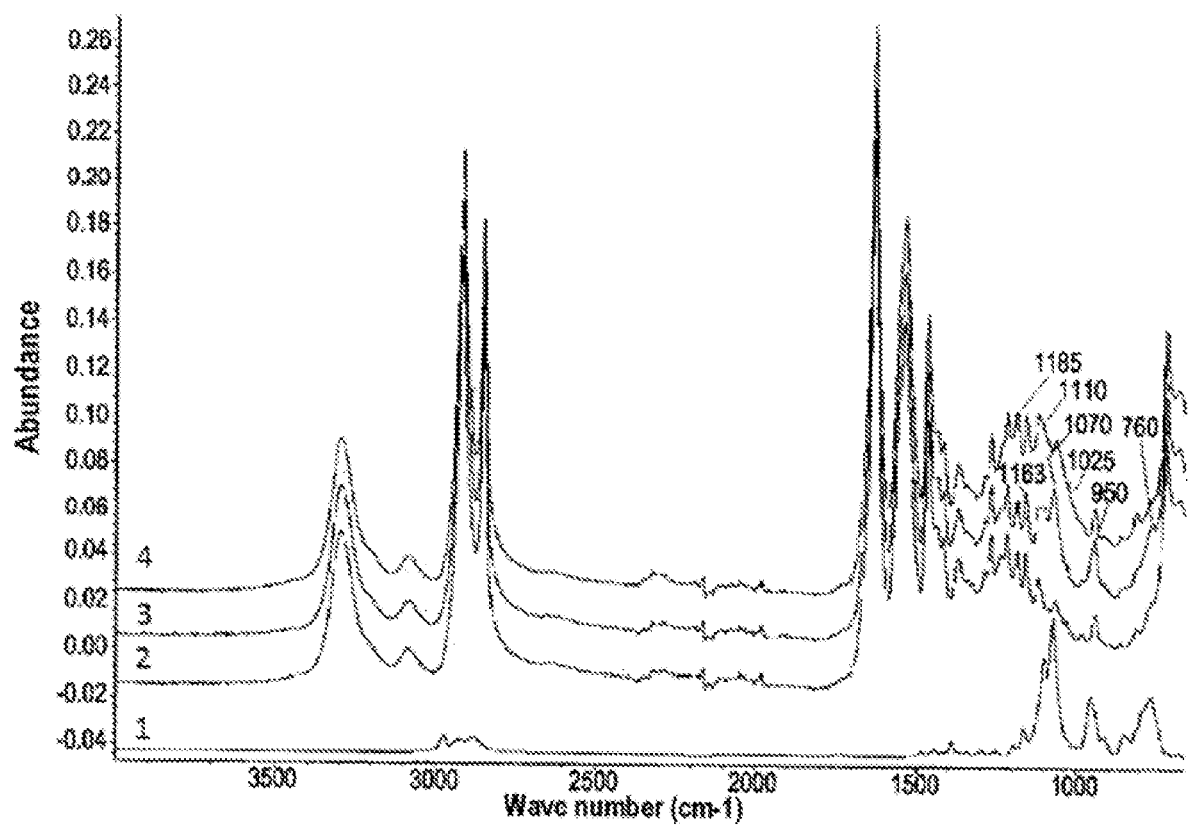

As for Example 1, the infrared analysis showed that the absorbance peak at 760 cm$^{-1}$, which is characteristic of the epoxy function of the silane present in the initial mixture (see FIG. 2, graph 3), had disappeared after the grafting phase (see FIG. 2, graph 4). These epoxy functions were consumed by the grafting reaction.

The characteristic absorbance peak for Si—O—C bonds at 950 cm$^{-1}$ was shifted to 1025 cm$^{-1}$. The absorbance peaks of the —O—CH$_2$— linkages of silane, at 1070 cm$^{-1}$ and 1163 cm$^{-1}$, were shifted to 1110 cm$^{-1}$ and 1185 cm$^{-1}$.

The shifting of the absorbance peaks for the characteristic bonds of silane is the result of grafting thereof to the polyamide.

TABLE 1

Thermal characteristics measured by DSC

| Polymer | 1$^{st}$ heating ramp-up | | | Cooling ramp-down | | | 2$^{nd}$ heating ramp-up | | |
|---|---|---|---|---|---|---|---|---|---|
| | Tfus Onset (° C.) | Tfus peak (° C.) | ΔHfus (J/g) | Tcryst Offset (° C.) | Tcryst peak (° C.) | ΔHcryst (J/g) | Tfus Onset (° C.) | Tfus Peak (° C.) | ΔHfus (J/g) |
| PA 12 (Orgasol Invent Smooth from Arkema) | 174 | 182 | −98 | 154 | 151 | 54.5 | 167 | 172/178 | −52.8 |
| PA 11 (Rilsan Invent Natural from Arkema) | 198 | 202 | −106.4 | 164 | 160 | 45.0 | 178 | 183/189 | −46.0 |
| Example 1 | 174 | 181 | −86.5 | 151 | 148 | 48.9 | 170 | 172/178 | −48 |
| Example 2 | 175 | 184 | −93.5 | 152 | 148 | 51.8 | 165 | −/179 | −53.5 |
| Example 3 | 178 | 183 | −86.5 | 151 | 148 | 48.9 | 170 | 172/178 | −48.0 |
| Example 4 | 199 | 205 | −103.6 | 161 | 156 | 44.6 | 176 | −/186 | −48.0 |
| Example 5 | 168 | 179 | −42.3 | 151 | 147 | 58.6 | 168 | 179 | −51.3 |
| Example 6 | 169 | 179 | −51 | 151 | 148 | 44.7 | 170 | −/180 | −53.0 |
| Example 7 | 177 | 191 | −40.5 | 157 | 162 | 47.2 | 174 | 183/190 | −48.0 |
| Comparative example | 168 | 179 | −41 | 159 | 152 | 44.6 | 169 | 179 | −49 |

TABLE 2

Grain size of powders

| | Grain size distribution (µm) | | | | | | |
|---|---|---|---|---|---|---|---|
| | By volume | | | | By number | | |
| Polymer | D10 | d50 | D90 | D90-D10 | D10 | d50 | D90 |
| PA 12 (Orgasol Invent Smooth) | 28 | 38 | 51 | 23 | 24 | 32 | 44 |
| PA 11 (Rilsan Invent Natural) | 15 | 37 | 71 | 56 | 6 | 9 | 22 |
| Example 1 | 26 | 37 | 52 | 26 | 22 | 33 | 44 |
| Example 2 | 28 | 38 | 53 | 25 | 24 | 33 | 45 |
| Example 3 | 27 | 41 | 54 | 27 | 23 | 35 | 46 |
| Example 4 | 16 | 40 | 74 | 58 | 8 | 12 | 24 |
| Comparative example | 35 | 71 | 121 | 86 | 5 | 10 | 35 |

Example 2: Preparation of a Powder of Spherical Particles of Crosslinkable Polyamide of Type PA 12 Grafted with 5% w/w of Glycidoxypropyl Triethoxysilane A PA 12 powder suitable for laser sintering (Orgasol invent smooth marketed by Arkema) (d50=38 µm, spherical grain, fusion temperature equal to 182° C., glass transition temperature equal to 40° C.) was modified according to the invention with 5% w/w of glycidoxypropyl triethoxysilane (Silquest A1871 marketed by Momentive Performance Materials Inc). PA 12 powder (Orgasol invent smooth marketed by Arkema) impregnated with glycidoxypropyl tri- The TGA analysis gave a volatiles content of less than 0.2%, indicating almost complete grafting.

The DSC analysis of the modified PA 12 powder showed that the thermal profile of the PA 12 powder had not been modified by the grafting (see Table 1).

As for Example 1, the grain size of the powder and the spherical shape of the grains of PA 12 were not modified (see Table 2 and FIG. 7). The particle size remained homogeneous: the (d90-d10) value was 25 µm, and was comparable to that for PA 12 (23 µm).

The film obtained by thermocompression was perfectly homogeneous. The PA 12 powder grafted with 5% w/w of glycidoxypropyl triethoxysilane was still thermoplastic.

Hence, the PA 12 particles grafted with 5% w/w of glycidoxypropyl triethoxysilane of the invention were spherical and homogeneous in size and suitable for the SLS technique. The powder obtained thereby was dry and had good flow properties. In addition, the thermal profile of the powder of spherical particles of PA 12 grafted with 5% w/w of glycidoxypropyl triethoxysilane of the invention had not been modified by the grafting and thus retained the thermal properties that are suitable for the SLS technique.

Example 3: Preparation of a Powder of Spherical Particles of Crosslinkable Polyamide of Type PA 12 Grafted with 8% w/w of Glycidoxypropyl Triethoxysilane A PA 12 powder suitable for laser sintering (Orgasol invent smooth marketed by Arkema) (d50=38 µm, spherical grain, fusion temperature equal to 182° C., glass transition temperature equal to 40° C.) was modified according to the invention with 8% w/w of glycidoxypropyl triethoxysilane (Silquest A1871 marketed by Momentive Performance Materials Inc), as described in the "Materials and method" section.

Figure 3:
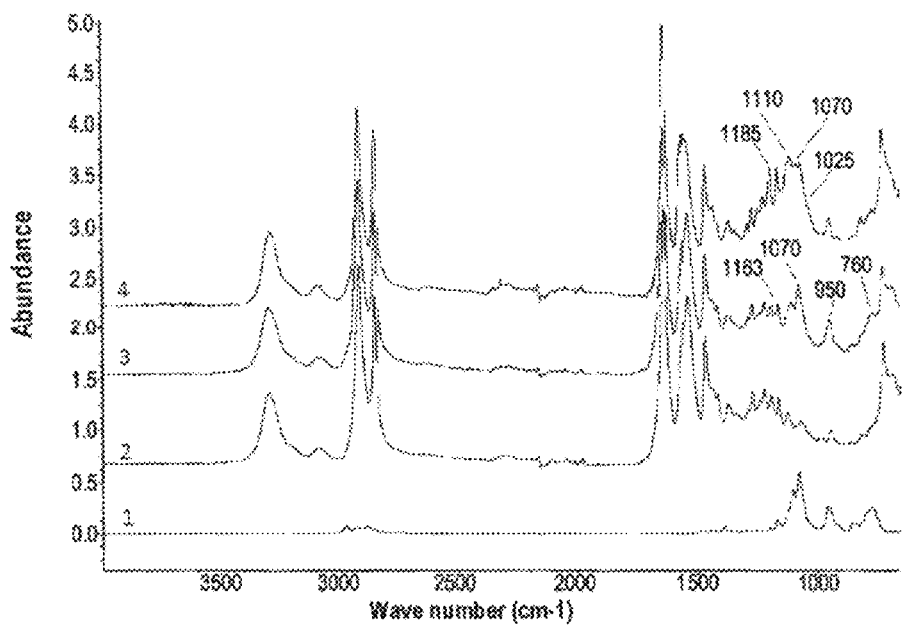

As for Example 1, the infrared analysis showed that the absorbance peak at 760 cm$^{-1}$, which is characteristic of the epoxy function of the silane, present in the initial mixture (see FIG. 3, graph 3), had disappeared after the grafting phase (see FIG. 3, graph 4). These epoxy functions were consumed by the grafting reaction.

The characteristic absorbance peak of Si—O—C bonds at 950 cm$^{-1}$ was shifted to 1025 cm$^{-1}$. The absorbance peaks of the —O—CH$_2$— bonds of silane, at 1070 cm$^{-1}$ and 1163 cm$^{-1}$, were shifted to 1110 cm$^{-1}$ and 1185 cm$^{-1}$.

The shifting of the absorbance peaks of the characteristic bonds of the silane are the result of grafting the latter onto the polyamide.

The absorbance peak at 1072 cm$^{-1}$ was still present at the end of the grafting reaction and co-existed with the peak at 1110 cm$^{-1}$ (see FIG. 3, graph 4). Thus, grafting was not complete.

The TGA analysis gave a volatile content of the order of 2-2.5%.

Despite incomplete grafting, the DSC analysis of the PA 12 powder modified with 8% w/w of silane showed that the thermal profile of the PA 12 powder had not been modified either by the grafting or by the presence of non-grafted silane (see Table 1).

The grain size of the powder and the spherical shape of the grains of PA 12 grafted in this manner were not modified (see Table 2 and FIG. 7). The particle size remained homogeneous: the (d90-d10) value was 27 μm, and was comparable to that of PA12 (23 μm).

The film obtained by thermocompression had bubbles due to evaporation of the silane. In contrast, it was not heterogeneous. The powder of PA grafted with 8% w/w of glycidoxypropyl triethoxysilane was still thermoplastic.

Thus, here again, the PA 12 particles grafted with 8% w/w of glycidoxypropyl triethoxysilane of the invention were spherical and homogeneous in size and suitable for the SLS technique. The powder obtained thereby was dry and had good flow properties. In addition, the thermal profile of the powder of spherical particles of PA 12 grafted with 8% w/w of glycidoxypropyl triethoxysilane of the invention had not been modified by the grafting and thus retained thermal properties that are suitable for the SLS technique.

Example 4: Preparation of a Powder of Spherical Particles of Crosslinkable Polyamide of the PA 11 Type Grafted with 6% w/w of Glycidoxypropyl Triethoxysilane A powder of PA 11 suitable for laser sintering (Rilsan Invent Natural marketed by Arkema) (d50=37 μm, irregular grain shape, fusion temperature equal to 202° C., glass transition temperature equal to 41° C.) was modified according to the invention by using 6% w/w of glycidoxypropyl triethoxysilane (Silquest A1871 marketed by Momentive Performance Materials Inc), as described in the "Materials and method" section.

Figure 4:
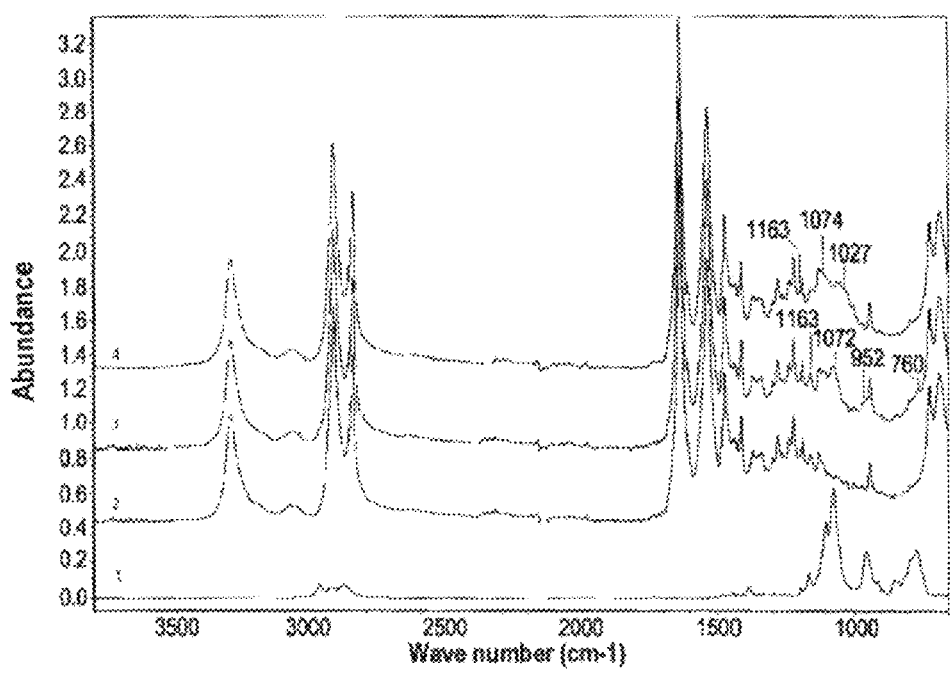

The infrared analysis showed that the absorbance peak at 760 cm$^{-1}$, which is characteristic of the epoxy function of the silane present in the initial mixture (see FIG. 4, graph 3), had disappeared after the grafting phase (see FIG. 4, graph 4). These epoxy functions were consumed by the grafting reaction.

The characteristic absorbance peak of Si—O—C bonds at 952 cm$^{-1}$ was shifted to 1037 cm$^{-1}$. The absorbance peaks of the —O—CH$_2$— bonds of silane at 1074 cm$^{-1}$ and 1163 cm$^{-1}$ were shifted to 1120 cm$^{-1}$ and 1198 cm$^{-1}$.

The shifting of the absorbance peaks of the characteristic bonds of silane are the result of grafting the latter onto the polyamide.

The TGA analysis gave a volatiles content of less than 0.2%, indicating almost complete grafting.

The DSC analysis of the grafted powder of PA 11 showed that the thermal profile of the powder of PA 11 had not been modified by grafting (see Table 1).

The grain size of the powder and the shape of the grafted PA 11 grains had not been modified (see Table 2 and FIG. 7). The particle size remained homogeneous: the (d90-d10) value was 58 μm, and was comparable to that of PA11 (56 μm).

The film obtained by thermocompression was perfectly homogeneous. The powder of PA 11 grafted with 6% w/w of glycidoxypropyl triethoxysilane was still thermoplastic.

Hence, the particles of PA 11 grafted with 6% w/w of glycidoxypropyl triethoxysilane of the invention were homogeneous in size and suitable for the SLS technique. The powder obtained thereby was dry and had good flow properties. In addition, the thermal profile of the powder of spherical particles of PA 11 grafted with 6% w/w of glycidoxypropyl triethoxysilane of the invention had not been modified by the grafting and thus retained the thermal properties that are suitable for the SLS technique.

Comparative Example:

A PA 12 powder suitable for laser sintering (Orgasol invent smooth marketed by Arkema) (d50=38 μm, spherical grain, fusion temperature equal to 182° C., glass transition temperature equal to 40° C.) was modified by reactive extrusion by using 5% w/w of glycidoxypropyl trimethoxysilane (Silquest A 187 marketed by Momentive Performance Materials Inc).

The grafting was carried out using a co-rotating twin screw extruder with a diameter of 26 mm and length 80 diameters (D), comprising 16 independent heating zones of 5 D. Regarding the temperature profile, the first zone was regulated at 200° C. All of the other zones were regulated at 220° C. The grafting was thus carried out in the molten phase.

The screw profile used was a standard screw profile used for grafting thermoplastic material. The rotational speed of the screw was fixed at 100 revolutions per minute (rpm) for a fixed polyamide flow rate of 4 kilograms per hour (kg/h).

The PA 12 and the silane were incorporated into the principal hopper at the base of the extruder in the form of a dry mixture.

The rod was cooled in water and granulated at the exit from the extruder.

The granules obtained were dried at 80° C. over 4 h in order to remove the surface moisture.

Because the grafting was being carried out in the extruder in the molten phase, the modified granules of PA 12 obtained were grafted in a homogeneous manner, at the core and at the surface.

A differential scanning calorimetric analysis (DSC) was carried out on the granules obtained in order to compare the thermal profile of the modified PA granules. This thermal analysis showed that the thermal profile of PA 12 modified by reactive extrusion had been modified (see Table 1). In particular, the fusion temperature observed (Tfus peak) and Tfus onset for the modified PA 12 were offset to lower temperatures. The crystallization temperature (Tcryst peak) and Tcryst offset were offset to higher temperatures. The sintering window (corresponding to the difference between Tfus offset and Tcryst offset) was therefore reduced by about 11° C. The fusion and crystallization enthalpies were also reduced.

The granules obtained were then cryo-milled with a Retsch Zm 200 laboratory mill (250 µm sieve, knife speed 12000 rpm). For this purpose, the granules were cooled in liquid nitrogen for 30 min before being introduced into the mill.

The powder obtained was then sieved at 100 µm using a Retsch AS200 lab sieve.

The grain size of the powder obtained was measured using laser granulometry and the shape of the particles was observed using an optical microscope. Compared with the non-modified PA 12 powder (Orgasol invent smooth marketed by Arkema), the particle size distribution had been modified and the shape of the particles was highly heterogeneous, irregular and non-spherical (see Table 2 and FIG. 7).

The modified PA 12 granules were thermoplastic. The film obtained from them was perfectly homogeneous. In contrast, the film obtained from the powder obtained by milling was heterogeneous. The lines of material flow were observable by the transparency, indicating an increase in viscosity or even an onset of crosslinking of the PA 12.

The PA 12 film modified by reactive extrusion and milled was thus unsuitable for the process of 3D printing by selective laser sintering, in particular because of the size distribution and the shape of the particles, and because of the reduced sintering window resulting from the reduction in the fusion temperature and the increase in the crystallization temperature.

The film pressed from the powder was immersed in water at 90° C. for 12 h, in order to produce crosslinking of the alkoxysilane groups by condensation hydrolysis. After the immersion cycle, the film was dried at 90° C. for 6 h in a ventilated oven. Test specimens were then cut with a punch.

Crosslinking was demonstrated by dynamic thermomechanical analysis (DMTA) of the cut specimens under tension, carried out at a frequency of 1 hertz (Hz) and with a temperature ramp-up of 5° C./min.

The graphs of the variation of the elastic modulus and of the tangent to the loss angle delta (Tan Delta) showed that after fusion of the crystalline phase of the PA 12 grafted with 5% w/w of glycidoxypropyl triethoxysilane by reactive extrusion, the elastic modulus did not collapse and was maintained up to 300° C., while that of the reference PA 12 (Orgasol invent smooth marketed by Arkema) collapsed completely upon fusion of the crystalline phase (FIG. 4).

Example 5: Use of the Powder of Spherical Particles of Crosslinkable Polyamide of Example 2 in SLS The powder of PA 12 particles grafted with 5% w/w of glycidoxypropyl triethoxysilane of Example 2 was sintered on a 3D printer of the SnowWhite type from Sharebot in order to produce an H2 type test specimen as defined in the standard ISO 527-1: 2012 for the determination of the mechanical properties of plastics materials under tension.

The thickness of the layer used to carry out this test was 100 µm.

The sintering parameters are indicated in Table 3. These parameters were the laser power, the laser scan speed and the environmental temperature.

On this type of machine, two ways of regulating the temperature are possible: regulation by measuring the temperature of the sintering chamber, carried out using a thermocouple, the environmental temperature, and regulation by measuring the surface temperature of the bed of powder, carried out using an infrared sensor. To sinter the PA 12 powder modified in accordance with Example 2, the mode of regulation by measuring the environmental temperature was selected.

TABLE 3

Sintering parameters on a 3D printer of the SnowWhite type from Sharebot

| Powder | Laser | | Temperature (° C.) | |
| --- | --- | --- | --- | --- |
| | Power (W) | Speed (mm/s) | Set | Control mode |
| PA 12 (Orgasol Smooth Invent from Arkema) | 2.46 | 1800 | 153 | Environment |
| PA 11 (Rilsan Invent Natural from Arkema) | 4.70 | 1600 | 167 | Environment |
| Example 5 | 7.84 | 1600 | 155 | Environment |
| Example 6 | 5.60 | 1000 | 149 | Environment |
| Example 7 | 7.84 | 1600 | 165 | Environment |

Compared with the non-grafted PA 12 powder (Orgasol Invent Smooth from Arkema), the power of the laser radiation and the scan speed for the laser were modified in a manner such as to transfer more energy to the powder in order to melt it correctly and obtain good sintering of the parts.

The thermoplasticity of the H2 test specimens obtained by laser sintering was validated by producing a thin film by thermocompression using a thermoregulated hydraulic press.

During sintering, the PA 12 powder grafted with 5% w/w of glycidoxypropyl triethoxysilane did not crosslink during passage of the laser.

In addition, the thermoplasticity of the powder of grafted PA 12 particles which had not been subjected to the impact of the laser was validated by producing a thin film. Thus, the grafted PA 12 powder did not crosslink under the action of heat. It could be re-used a large number of times (at least 5 times) in order to carry out other sintering tests.

The DSC analysis of the sintered H2 test specimen showed that the thermal profile of the powder after fusion and re-crystallization occurring during sintering was comparable to that of the modified PA powder of the comparative example. Thus, the results of the comparative example showed that a PA 12 with a thermal profile suitable for selective laser sintering lost the latter when it was melted and re-crystallized.

The crosslinking of the sintered parts formed from modified PA caused by condensation hydrolysis of the alkoxysilane groups was carried out by immersion in water at 90° C. for 12 h.

After the immersion cycle, the test specimens were dried at 90° C. for 6 h in ventilated oven.

Crosslinking was demonstrated by dynamic thermomechanical analysis (DMTA) under tension, carried out at a frequency of 1 Hz and with a temperature ramp-up of 5° C./min.

Figure 5:
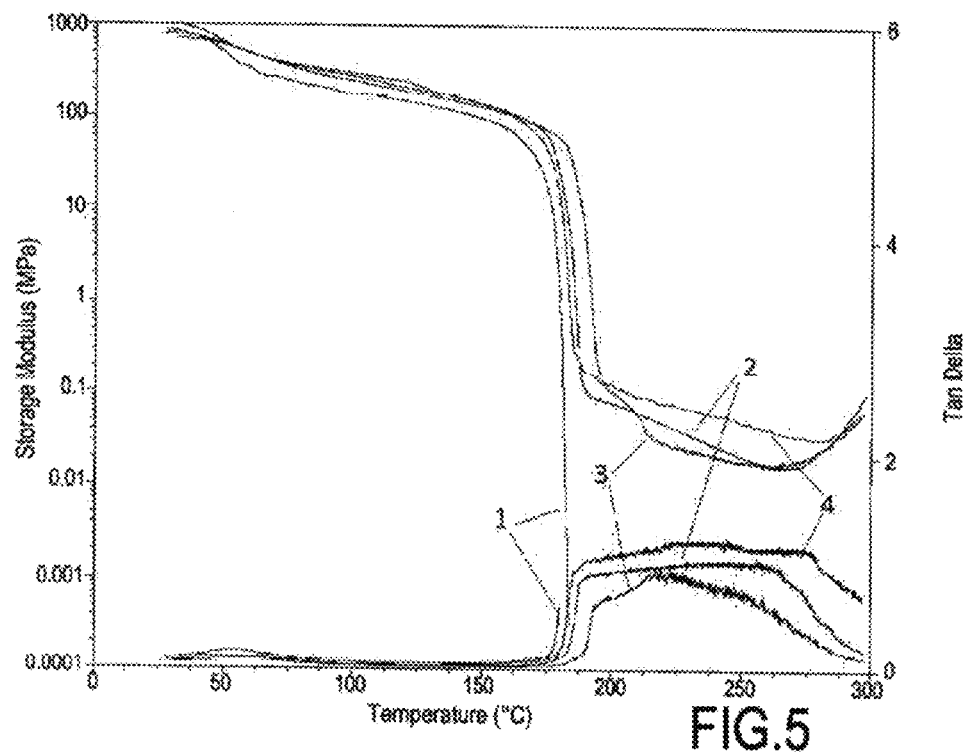

The graphs of the variation of the elastic modulus and of the tangent to the loss angle delta (Tan Delta) showed that after fusion of the crystalline phase of the PA 12 grafted with 5% w/w of glycidoxypropyl triethoxysilane, the elastic modulus did not collapse and was maintained up to 300° C., while that of the reference PA 12 (Orgasol invent smooth marketed by Arkema) collapsed completely upon fusion of the crystalline phase (FIG. 5).

This behavior was comparable with that of a polyethylene that can be crosslinked by a silane pathway (Pex-b), as is well known to the person skilled in the art, which generally has proportions of crosslinking of 60% to 70%.

Hence, the powder of PA 12 particles grafted with 5% w/w of glycidoxypropyl triethoxysilane of the invention does not crosslink and remains thermoplastic during the passage of the laser during the sintering step. After crosslinking of a sintered test specimen, the thermomechanical properties were improved compared with those of a sintered part from a powder of PA 12 particles that cannot be crosslinked.

In FIG. 5, a comparison of the thermomechanical properties of PA 12 modified according to the invention and crosslinked after selective laser sintering (graph 2) with those of PA 12 modified by reactive extrusion in accordance with the comparative example and crosslinked after being formed by thermocompression (graph 4) shows, in same way as for example 5, that grafting the crosslinking agent of the invention resulted in a level of crosslinking close to that obtained when grafting was carried out by reactive extrusion.

This result proves that the modification of the powder of the invention indeed results in grafting at the surface and in the core of the particles, provided that the thermomechanical properties of PA 12 modified according to the invention and crosslinked after selective laser sintering are comparable with those of a PA 12 grafted in the core and crosslinked.

Grafting at the surface alone would result in crosslinking of a small fraction of the PA (less than 10% of the PA). With such a quantity of crosslinked PA, the modified PA 12 would behave like a PA 12 filled with any filler to an extent of 10%. The person skilled in the art is aware that for such a material, the elastic modulus would collapse after the fusion temperature, like the unfilled and unmodified PA 12.

Example 6: Use of the Powder of Spherical Particles of Crosslinkable Polyamide of Example 3 in SLS The powder of PA 12 particles grafted with 8% w/w of glycidoxypropyl triethoxysilane from Example 3 was sintered on a SnowWhite type 3D printer from Sharebot to produce a test specimen of the H2 type.

The thickness of the layer used to carry out this test was 100 µm and the mode of regulation was by measurement of the environmental temperature.

The sintering parameters are indicated in Table 3.

In a manner analogous to that of Example 5, sintering of this powder of grafted PA 12 particles required a larger input of energy compared with the non-grafted PA 12 to melt the powder correctly during the passage of the laser and obtain good sintering of the parts.

The thermoplasticity of the H2 test specimens obtained by laser sintering and the thermoplasticity of the powder of grafted PA 12 particles which had not been sintered but which had undergone the complete thermal cycle of the sintering procedure were validated by producing a thin film by thermocompression using a thermoregulated hydraulic press.

The DSC analysis of the sintered H2 test specimen showed a thermal profile similar to that of the test specimen sintered in Example 5.

After crosslinking the parts obtained by sintering from modified PA, carried out by immersion in water at 90° C. for 12 h, the test specimens were dried at 90° C. for 6 h in a ventilated oven before being evaluated by dynamic thermomechanical analysis (carried out under tension, at a frequency of 1 Hz and with a temperature ramp-up of 5° C./min).

The graphs of the variation of the elastic modulus and of the tangent to the loss angle delta showed that after fusion of the crystalline phase of the modified PA 12, the elastic modulus did not collapse and was maintained up to 300° C., while that of the reference PA 12 (Orgasol invent smooth marketed by Arkema) collapsed completely upon fusion of the crystalline phase (FIG. 5). The reduction in the modulus linked to fusion was offset by about ten degrees to the higher temperature compared with the reference PA 12 and the crosslinked PA 12 of Example 5. This offset is most probably linked to the excess of non-grafted silane for the powder prepared in accordance with Example 3, which after all participates in the process of condensation hydrolysis and contributes to increasing the crosslinking density.

Hence, the powder of PA 12 particles grafted with 8% w/w of glycidoxypropyl triethoxysilane of the invention does not crosslink and remains thermoplastic during the passage of the laser during the sintering step. After crosslinking of a sintered test specimen, the thermomechanical properties are improved compared with those of a sintered part from a powder of PA 12 particles that cannot be crosslinked.

In FIG. 5, a comparison of the thermomechanical properties of PA 12 modified according to the invention and crosslinked after selective laser sintering (graph 3) with those of PA 12 modified by reactive extrusion in accordance with the comparative example and crosslinked after being produced by thermocompression (graph 4), shows that grafting the crosslinking agent of the invention resulted in a level of crosslinking close to that obtained when grafting was carried out by reactive extrusion.

This result proves that modification of the powder of the invention indeed results in grafting at the surface and in the core of the particles Example 7: Use of the Powder of Spherical Particles of Crosslinkable Polyamide of Example 4 in SLS The powder of particles of PA 11 grafted with 5% w/w of glycidoxypropyl triethoxysilane in accordance with Example 4 was sintered on a SnowWhite type 3D printer from Sharebot in order to produce a test specimen of the H2 type. The thickness of the layer used to carry out this test was 100 µm and the mode of regulation that was selected was the measurement of the environmental temperature. The sintering parameters are indicated in Table 3.

Compared with the reference PA 11 (Rilsan Invent Natural marketed by Arkema), the powder of PA 11 modified in accordance with Example 4 necessitated the supply of more energy during the laser pass in order to correctly melt and obtain good sintering of the parts.

The thermoplasticity of the H2 test specimens obtained by laser sintering and the thermoplasticity of the modified powder of PA 11 particles which had not been sintered but which had undergone the complete thermal cycle of the sintering procedure were validated by producing a thin film by thermocompression with a thermoregulated hydraulic press.

After crosslinking the parts obtained by sintering from the powder of particles of PA 11 grafted in accordance with Example 4, carried out by immersion in water at 90° C. for 12 h, the test specimens were dried at 90° C. for 6 h in a ventilated oven before being evaluated by dynamic thermomechanical analysis (carried out under tension, at a frequency of 1 Hz and with a temperature ramp-up of 5° C./min).

Figure 6:
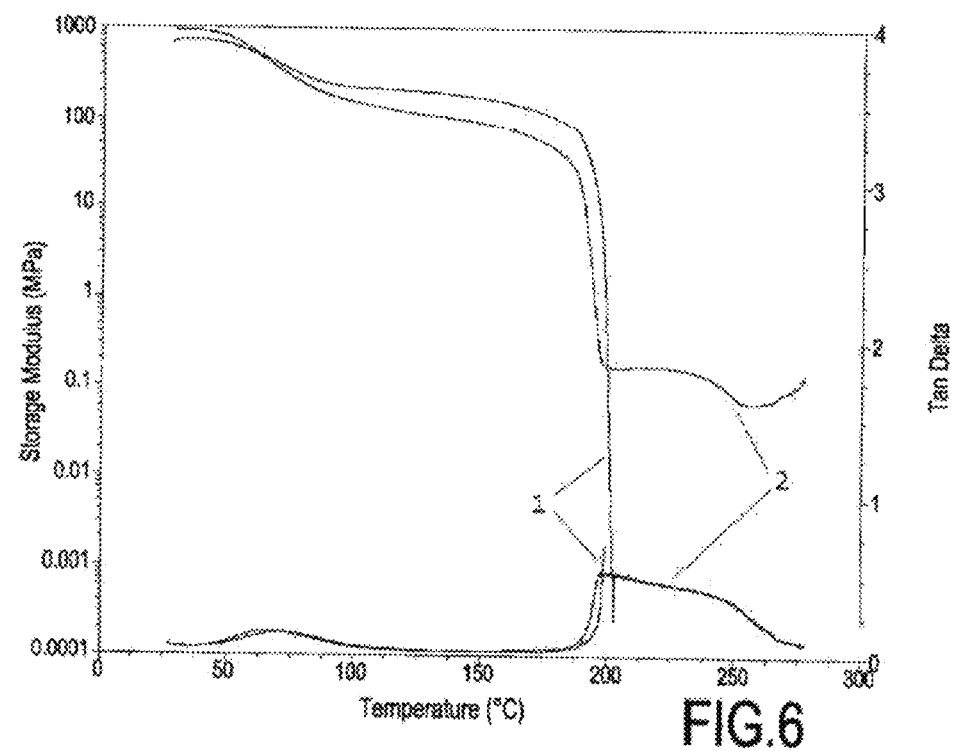
FIG. 6 represents graphs of the variation of the elastic modulus and the loss factor or damping factor corresponding to the tangent of the loss angle delta (Tan Delta), for Example 7 compared with that for the reference PA 11, with:
graph 1: PA 11 (Rilsan Invent Natural from Arkema); and
graph 2: Example 7.

The graphs of the variation of the elastic modulus and the tangent to the loss angle delta showed that after fusion of the crystalline phase of the modified PA 11, the elastic modulus did not collapse and was maintained up to 300° C., while that of the reference PA 11 (Rilsan Invent Natural marketed by Arkema) collapsed completely upon fusion of the crystalline phase (see FIG. 6).

As for Examples 5 and 6, these thermomechanical properties indicate that grafting the crosslinking agent of the invention onto PA 11 does indeed result in grafting at the surface and at the core of particles of PA 11, and so they are suitable for the selective laser sintering process.

The invention claimed is:

1. A powder of spherical particles of polyamide (I) functionalized by crosslinking functions Rt rendering it crosslinkable, wherein said crosslinking functions Rt are present at the surface and in the mass of said particles and in that said particles of crosslinkable polyamide (I) have a mean diameter d50 in the range of 20 μm to 100 μm; wherein the crosslinking functions Rt are introduced onto a polyamide (II) by grafting, and the crosslinking functions Rt are supplied by grafting, directly onto the amine and/or carboxyl and/or amide functions of the polyamide (II), termed reactive functions Rr, of a crosslinking agent (III) with formula:

$$\text{Rg-R1-Si(R2)}_{3-a}\text{(R3)a} \quad \text{(III)}$$

in which:
- a=0, 1, or 2;
- Rg is a grafting function that is capable of reacting with Rr;
- R1 is a divalent hydrocarbon group or a covalent bond connecting Si directly to Rg;
- R2 is an alkoxy or acyl group or represents a halogen, the groups R2 being identical or different when a=0 or 1;
- R3 is an alkyl group, the groups R3 being identical or different when a=2;

and the crosslinking agent (III) is such that a=0, R1 is a divalent hydrocarbon group, R2 is an alkoxy group, Rg is an epoxy group.

2. The powder of spherical particles of crosslinkable polyamide (I) according to claim 1, wherein the mean diameters d90 and d10 of said particles of crosslinkable polyamide (I) are such that (d90-d10) is in the range 10 μm to 80 μm.

3. The powder of spherical particles of crosslinkable polyamide (I) according to claim 1, wherein the polyamide is an aliphatic or semi-aromatic, semi-crystalline polyamide.

4. The powder of spherical particles of crosslinkable polyamide (I) according to claim 1, wherein the polyamide is selected from the group consisting of PA 6, PA 6.6, PA 10.10, PA 10.12, PA 11 and PA 12.

5. The powder of spherical particles of crosslinkable polyamide (I) according to claim 1, wherein the crosslinking functions Rt are selected from the group consisting of alkoxysilane, chlorosilane and acyloxysilane groups.

6. The powder of spherical particles of crosslinkable polyamide (I) according to claim 1, wherein the grafting function Rg of the crosslinking agent (III) comprises at least one group selected from:
- the amino group —NH$_2$;
- groups having an ethylenic unsaturation;
- epoxy groups;
- the thiol function —SH;
- halogen atoms;
- the isocyanate group —N=C=O; and
- the acylurea group —CO—NH—CO—NH$_2$ or the alkylurea group R—NH—CO—NH$_2$, with R representing a divalent hydrocarbon group.

7. A powder of spherical particles of crosslinkable polyamide (I) according to claim 1, wherein the crosslinkable polyamide (I) has a proportion of crosslinking functions Rt in the range 0.3% to 9% by weight relative to the total weight of crosslinkable polyamide.

8. A process for the preparation of an intermediate article from a powder of spherical particles of crosslinkable polyamide (I) according to claim 1, using a selective laser sintering technique.

9. A process for the preparation of an article, comprising:
- i. forming an intermediate article using a selective laser sintering technique, starting from a powder of spherical particles of crosslinkable polyamide (I) according to claim 1; and
- ii. crosslinking at least a portion of the crosslinkable functions Rt of said crosslinkable polyamide (I) of the intermediate article.

10. The process according to claim 9, wherein the crosslinking is carried out by hydrolysis in ambient air.

* * * * *